US008997657B2

(12) United States Patent
Meister

(10) Patent No.: US 8,997,657 B2
(45) Date of Patent: Apr. 7, 2015

(54) BALLAST LOAD DEVICE AND METHOD

(71) Applicant: Donald E. Meister, LaGrange, GA (US)

(72) Inventor: Donald E. Meister, LaGrange, GA (US)

(73) Assignee: Trackmobile LLC, Lagrange, GA (US)

( * ) Notice: Subject to any disclaimer, the term of this patent is extended or adjusted under 35 U.S.C. 154(b) by 90 days.

(21) Appl. No.: 13/669,606

(22) Filed: Nov. 6, 2012

(65) Prior Publication Data

US 2013/0118374 A1   May 16, 2013

Related U.S. Application Data

(60) Provisional application No. 61/556,567, filed on Nov. 7, 2011.

(51) Int. Cl.
*B61C 11/00* (2006.01)
*B61C 7/00* (2006.01)
*B60F 1/04* (2006.01)
*B61J 3/12* (2006.01)

(52) U.S. Cl.
CPC . *B61C 7/00* (2013.01); *B60F 1/043* (2013.01); *B61J 3/12* (2013.01)

(58) Field of Classification Search
USPC .............. 105/72.2, 215.1, 215.2, 73; 280/759
See application file for complete search history.

(56) References Cited

U.S. PATENT DOCUMENTS

| | | | |
|---|---|---|---|
| 1,732,462 A | 10/1929 | Doble | |
| 2,722,897 A * | 11/1955 | Morey | 105/73 |
| 3,834,319 A | 9/1974 | Kastenbein | |
| 4,094,534 A * | 6/1978 | Welke et al. | 280/760 |
| 4,155,309 A | 5/1979 | Ames et al. | |
| 4,537,137 A * | 8/1985 | White, Jr. | 105/72.2 |
| 4,878,436 A * | 11/1989 | Lich et al. | 105/72.2 |
| 5,301,615 A * | 4/1994 | Evans et al. | 105/75 |
| 6,324,993 B1 * | 12/2001 | Jacob | 105/72.2 |
| 6,471,245 B1 * | 10/2002 | Schott | 280/759 |
| 6,533,319 B1 * | 3/2003 | Denby et al. | 280/759 |
| 6,976,432 B2 * | 12/2005 | Jacob | 105/72.2 |
| 6,988,451 B2 * | 1/2006 | Marcotte et al. | 105/215.1 |
| 7,201,106 B2 * | 4/2007 | Whiston et al. | 105/72.2 |
| 7,513,529 B2 * | 4/2009 | Defrancq | 280/759 |
| 8,419,064 B2 * | 4/2013 | Erhardt | 280/759 |
| 2008/0129028 A1 * | 6/2008 | Hamm et al. | 280/759 |
| 2013/0118374 A1 * | 5/2013 | Meister | 105/73 |

* cited by examiner

*Primary Examiner* — Jason C Smith
(74) *Attorney, Agent, or Firm* — Banner & Witcoff, Ltd.

(57) ABSTRACT

A ballast load device for increasing a tractive effort of a railcar mover having a coupler includes a side member and a bottom attached to the side member. The bottom is adapted to support a weight. A primary coupler is attached to the side member and is adapted to removably connect to the coupler of the railcar mover such that the railcar coupler may lift the ballast load device.

20 Claims, 3 Drawing Sheets

US 8,997,657 B2

BALLAST LOAD DEVICE AND METHOD

CLAIM OF PRIORITY

This application claims priority to U.S. Provisional Patent Application No. 61/556,567, filed Nov. 7, 2011, the contents of which are hereby incorporated by reference.

FIELD OF THE INVENTION

The present invention relates generally to mobile railcar movers and, more particularly, to a ballast load device and method for mobile railcar movers.

BACKGROUND

As is known in the art, mobile railcar movers are used in rail yard switching operations and to shunt railcars around rail yards. Railcar movers are typically equipped with hydraulically-powered couplers on each end that lift up on the attached railcars' couplers to transfer additional eight from the railcars to the railcar mover to increase the traction of the railcar mover.

As an example, if the railcar mover has a dead weight of 50.000 lbs., and transfers an additional 50,000 lbs. via the hydraulically-powered couplers on each end from attached loaded railcars (i.e. the railcar mover is "double-coupled") the effective total weight of the railcar mover for purposes of traction is 150,000 lbs. This would typically create approximately 49,500 lb of tractive effort (150,000 lbs.×0.33 coefficient of friction).

A railcar mover, however, typically operates 90-95% of the time coupled to a single railcar. In other words, only one of the railcar mover's hydraulically-powered couplers is being used. This is because most plant switching applications cannot efficiently operate with railcar movers being double-coupled due to either space or safety concerns. Furthermore, in a railcar switching yard, when a railcar mover is double-coupled, a ground man is required at both distal ends of the joined railcars to safely move the cars. For a single railcar, this only allows 50% of the maximum traction available for the railcar mover.

A need exists for a device and method of using the device that addresses the above issues.

DETAILED DESCRIPTION OF EMBODIMENTS

Figure 1:
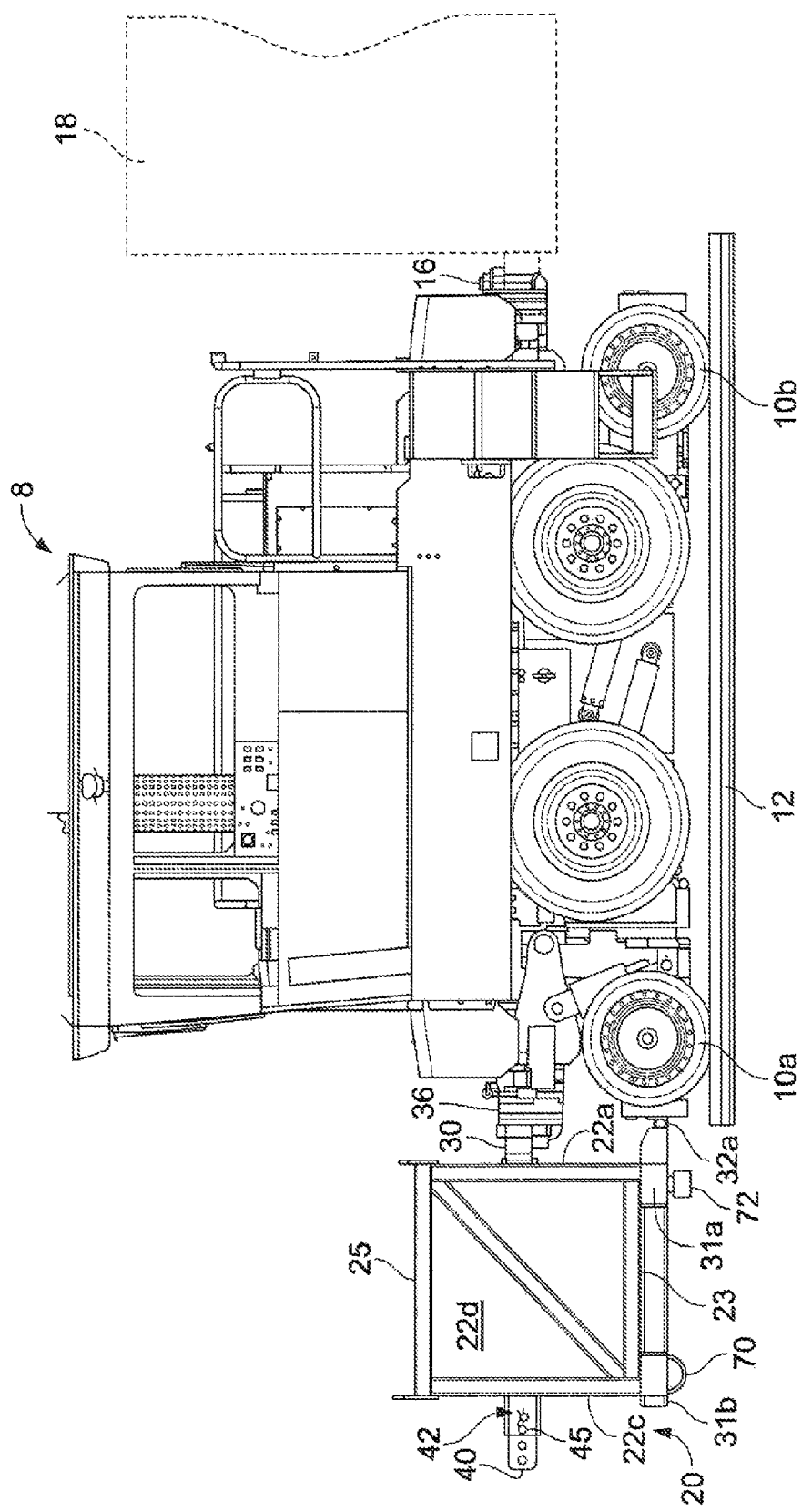
FIG. 1 is a side elevational view of the a railcar mover equipped with an embodiment of the ballast load device of the present invention.

In accordance with the present invention, providing a ballast load device on a railcar mover, such as the one indicated in general at 8 in FIG. 1, increases the tractive effort of the railcar mover wheels 10a and 10b (and the corresponding wheels on the opposite side of the railcar mover) on a track 12 when only one of the railcar mover couplers 16 is being used to move a railcar—indicated in phantom at 18. When such a ballast load device is used in accordance with the invention, the tractive effort of the railcar mover 8 can approach the double coupled tractive effort performance level.

While the present invention is described below in terms of a box, it may take any form by which weight may be supported and lifted by a railcar mover coupler.

Figure 2:
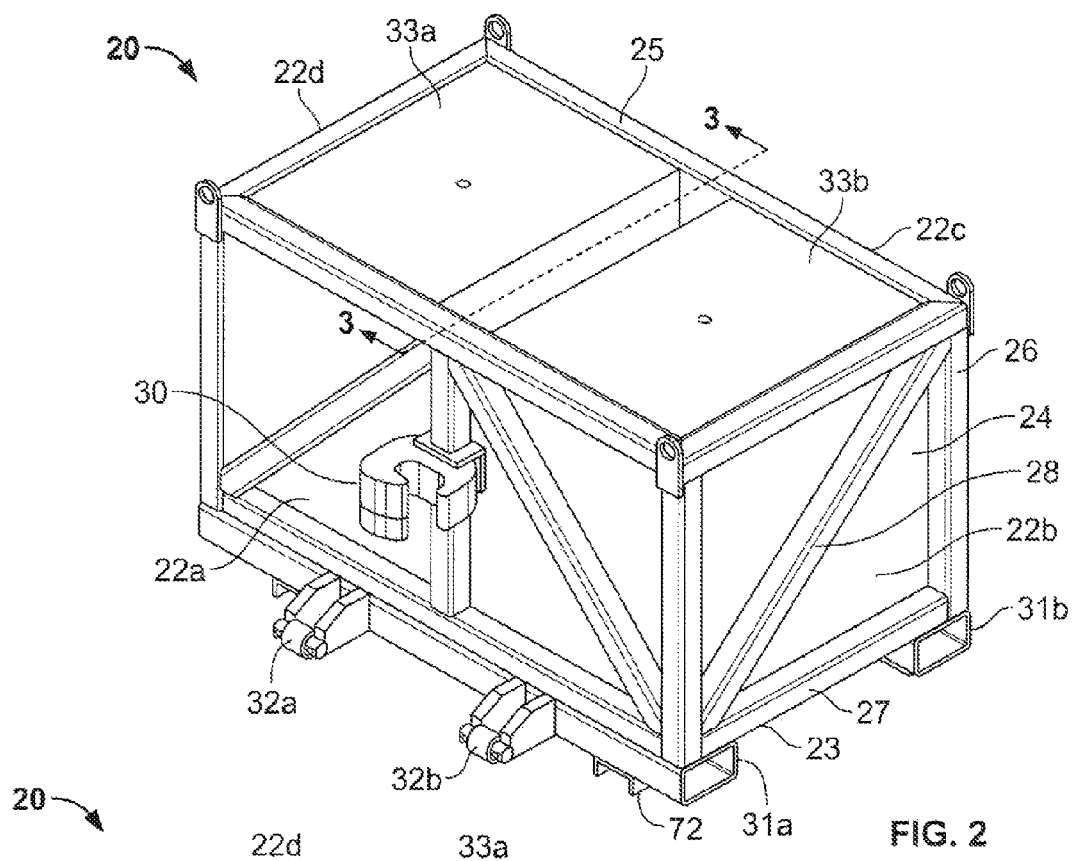
FIG. 2 is a perspective view of the ballast load device of FIG. 1.

An embodiment of the ballast load device of the present invention is indicated in general at 20 in FIGS. 1 and 2. The ballast load device or box includes four side members or walls 22a-22d, a bottom 23 and an open top 25. Side wall 22b is constructed of a panel portion 24 and is reinforced by a framework consisting of vertical struts 26, horizontal struts 27 and a diagonal strut 28. The other side walls feature a similar construction. The panels, struts and side walls may be secured together by welding, fasteners, brackets or any other secure fastening arrangement known in the art. The bottom 23 of the ballast load box includes a panel reinforced by a pair of support beams 31a and 31b running along the front and rear edges of the bottom. The support beams 31a and 31b feature open ends that are sized and spaced so as to accept lift truck forks to move the ballast load box to and from the rail. Of course any side wall and bottom construction known in the art that will support and contain the contents of the ballast load box may be used. Examples include, but are not limited to, one inch thick steel plating or simply a framework consisting of struts such as 26, 27 and 23 (without panels).

The struts 26, 27 and 28 and support beams 31a and 31b are preferably constructed of steel bars or tubing, while panel 24 is preferably one quarter inch thick steel plating.

As illustrated in FIGS. 1 and 2, a AAR profile coupler 30 is provided on the sidewall 22a of the ballast load box. In addition, a pair of rollers 32a and 32b is provided on support beam 31a of the ballast load box bottom, the purpose for which will be explained below.

The ballast load box is loaded with weights 33a and 33b (FIG. 2). Weights 33a and 33b may be replaced by a single weight or an additional number of weights. Indeed, the weight placed in the ballast load box may take any number of forms including, but not limited to, bags containing sand or the like, bags or other containers filled with water and lead, concrete or steel plates or blocks. Of course, the weight of the ballast load box contributes to the total weight provided by the device.

As an example only, for a ballast load box having a shell (i.e. the box 20 without the weights 33a and 33b) constructed of one half inch thick steel wall tubing having dimensions 7.5 ft. wide by 5 ft. high by 4.5 ft. deep and weighing 4,500 lbs., the following approximate total weights by material were obtained during testing:

| | |
|---|---:|
| 4,500 lbs+43,660 lbs=48,160 lbs | Steel plates |
| 4,500 lbs+10,800 lbs=15,300 lbs | Concrete |
| 4,500 lbs+4,600 lbs=9,100 lbs | Water |
| 4,500 lbs+8,600 lbs=13,100 lbs | Sand |
| 4,500 lbs+51,000 lbs=55,500 lbs | Lead |

Of course the ballast load box may be constructed with alternative dimensions as dictated by the application and the weight used.

Figure 3:
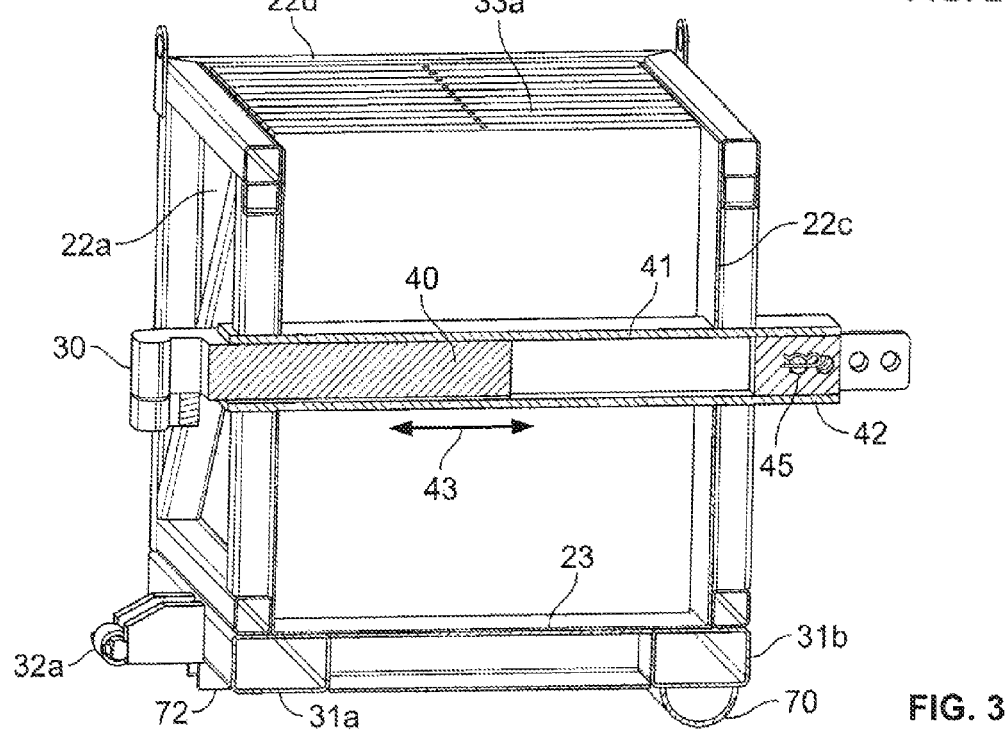
FIG. 3 is a perspective section view of the ballast load device taken along line 3-3 of FIG. 2 illustrating horizontal adjustment of the coupler of the ballast load device of FIGS. 1 and 2.

As illustrated in FIGS. 1 and 3 the coupler 30 is mounted on an elongated member 40. As shown in FIG. 3, the elongated member 41 passes through an opening in side wall 22a, through the interior of the ballast load box 20 and guide 41 and exits through a collar 42 positioned on side wall 22c. The elongated member 40 is free to slide in the horizontal direction (as indicated by arrow 43 in FIG. 3) between positions. As a result, the coupler 30 may be extended or retracted to fit different models of railcar movers. Locking holes are formed through the elongated member 40 and the collar 42. When the desired position of coupler 30 is determined and selected, a locking pin, illustrated at 45 in FIG. 1 and FIG. 3 is inserted through the aligned corresponding holes in elongated member 40 and collar 42 to lock the coupler in place. Alternative locking arrangements known in the art could be used instead of the locking pin and hole arrangement described.

In operation, a hydraulically-powered coupler 36 of the railcar mover is placed in a lowered position, and the coupler 30 of the ballast load box 20 is connected thereto. With referenced to FIG. 1, the coupler 36 is then raised so that the ballast load box is raised to increase the effective weight, and thus tractive force, of the railcar mover 8. As the ballast load box 20 is raised, rollers 32a and 32b engage the bumper surfaces of the railcar mover 8 so as to guide and stabilize the ballast load box.

As illustrated in FIGS. 1-3, a semi round tube 70 preferably is mounted to the bottom support beam 31b of the ballast load box, while a channel-shaped stand 72 (such as an inverted U-shape) preferably is mounted to the bottom support beam 31a. The semi-round tube 70 provides a rounded surface when setting the ballast load box onto the rail. The channel-shaped stand 72 acts as a guide to laterally position on to the rail 12 in FIG. 1 when the mobile car mover sets the ballast load box down to connect or disconnect from the ballast load box.

Figure 4:
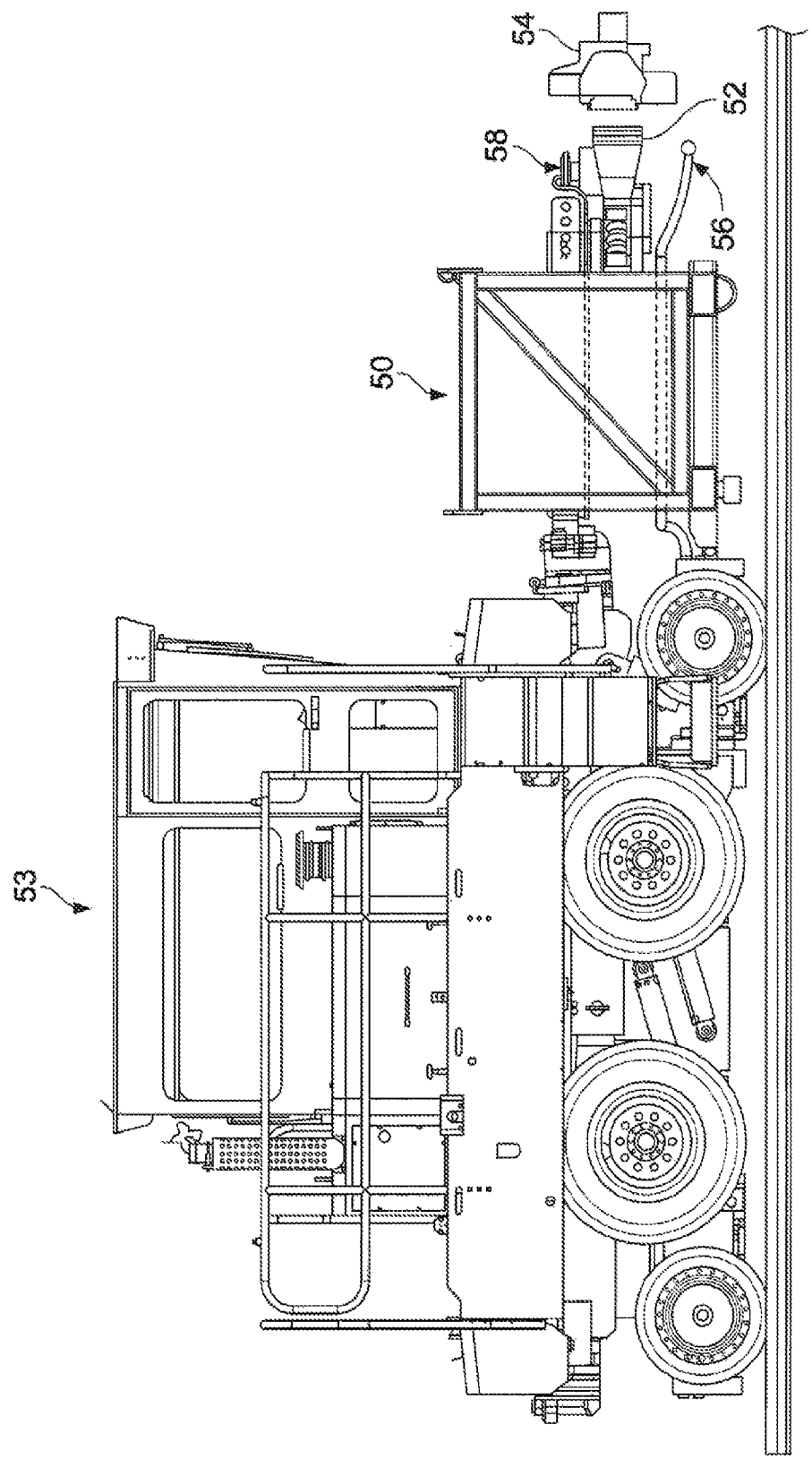
FIG. 4 is a side elevational view of a railcar mover equipped with an alternative embodiment of the ballast load device of the present invention.

As noted previously, a railcar mover may couple and move cars from either end or both ends of the railcar mover. When adding the ballast load box described above to the rail car mover, however, that end of the rail car mover cannot be used for coupling railcars. In accordance with a second embodiment of the ballast load box of the invention, indicated in general at 50 in FIG. 4, an auxiliary AAR coupler 52 is secured to the opposite side of the ballast box that is coupled to the railcar mover 53. The auxiliary AAR coupler 52 may be connected to the coupler 54 of a railcar and thus would regain the use of both ends of the railcar mover. An additional airline 56 is designed into the ballast load box 50 for actuating the air brakes of the railcar coupled to the ballast load box and operating the auxiliary coupler release 58 from the railcar mover cab. The remainder of the ballast load box 50 of FIG. 4 features the same construction as ballast load box 20 of FIGS. 1-3.

In summary, the ballast load box is a structure that may weigh, for example, up to approximately 48,000 lbs, and incorporates an AAR profile coupler that can be extended or retracted to fit different models of railcar movers. The ballast load box is equipped with two rollers below the coupler to guide the ballast load box as it is raised and lowered by the railcar mover hydraulically-powered coupler. Using the ballast load box, the operator finds it is easier to accomplish railcar moves as compared to having an additional fifty or sixty foot loaded railcar coupled to the front of the railcar mover to get additional weight transfer for added traction.

While the preferred embodiments of the invention have been shown and described, it will be apparent to those skilled in the art that changes and modifications may be made therein without departing from the spirit of the invention, the scope of which is defined by the appended claims.

What is claimed is:

1. A ballast load device for increasing a tractive effort of a railcar mover having a coupler comprising:
   a) a side member including a rear side wall;
   b) a bottom attached to the side member and adapted to support a weight;
   c) a primary coupler attached to the side member and adapted to removably connect to the coupler of the railcar mover such that the railcar coupler may lift the ballast load device;
   d) a collar mounted on said rear side wall; and
   e) an elongated member upon which the primary coupler is supported, said elongated member received within the collar in a sliding fashion so that a horizontal position of the coupler with respect to the ballast load box may be selected.

2. The ballast load device of claim 1 further comprising a weight supported by the bottom of the ballast load device.

3. The ballast load device of claim 1 further comprising a front side wall and a pair of opposing side walls, all connected to the bottom so that a box having an interior and an open top is defined.

4. The ballast load device of claim 3 wherein the bottom includes a panel and each side wall includes a panel, a horizontal strut and a vertical strut.

5. The ballast load device of claim 1 further comprising a collar locking hole formed through the collar and a plurality of locking holes formed through the elongated member and a locking pin adapted to be positioned within the collar locking hole and an elongated member locking hole aligned with the collar locking hole.

6. The ballast load device of claim 1 further comprising a guide within which the elongated member is received in a sliding fashion, said guide passing through the interior of the ballast load device.

7. The ballast load device of claim 1 further comprising an auxiliary coupler adapted to couple to a railcar.

8. A ballast load device for increasing a tractive effort of a railcar mover having a coupler and a bumper surface comprising:
   a) a side member;
   b) a bottom attached to the side member and adapted to support a weight;
   c) a primary coupler attached to the side member and adapted to removably connect to the coupler of the railcar mover such that the railcar coupler may lift the ballast load device;
   d) a roller connected to the bottom, said roller adapted to engage the railcar mover bumper surface when the primary coupler of the ballast load device is connected to the railcar mover coupler and raised by the railcar mover.

9. The ballast load device of claim 8 further comprising a pair of support beams connected to the bottom.

10. The ballast load device of claim 9 wherein the roller is connected to one of the pair of support beams.

11. The ballast load device of claim 8 further comprising a weight supported by the bottom of the ballast load device.

12. The ballast load device of claim 8 wherein the side member is a rear side wall and further comprising a front side wall and a pair of opposing side walls, all connected to the bottom so that a box having an interior and an open top is defined.

13. A ballast load device for increasing a tractive effort of a railcar mover having a coupler comprising:
   a) a side member;
   b) a bottom attached to the side member and adapted to support a weight;

c) a primary coupler attached to the side member and adapted to removably connect to the coupler of the railcar mover such that the railcar coupler may lift the ballast load device;

d) a pair of support beams connected to the bottom, each of the pair of support beams featuring an open end where the open ends are sized and spaced to receive lift truck forks.

14. The ballast load device of claim 13 further comprising a weight supported by the bottom of the ballast load device.

15. The ballast load device of claim 13 wherein the side member is a rear side wall and further comprising a front side wall and a pair of opposing side walls, all connected to the bottom so that a box having an interior and an open top is defined.

16. A ballast load device for increasing a tractive effort of a railcar mover having a coupler comprising:

a) a side member;

b) a bottom attached to the side member and adapted to support a weight;

c) a primary coupler attached to the side member and adapted to removably connect to the coupler of the railcar mover such that the railcar coupler may lift the ballast load device;

d) a pair of support beams connected to the bottom;

e) a channel-shaped stand attached to one of the pair of support beams, said channel-shaped stand sized and shaped to receive a rail of a railroad track.

17. The ballast load device of claim 16 further comprising semi-round member positioned one of the pair of support beams upon which the channel-shaped stand is not positioned.

18. The ballast load device of claim 16 further comprising a weight supported by the bottom of the ballast load device.

19. The ballast load device of claim 16 wherein the side member is a rear side wall and further comprising a front side wall and a pair of opposing side walls, all connected to the bottom so that a box having an interior and an open top is defined.

20. The ballast load device of claim 16 wherein the bottom includes a panel and each side wall includes a panel, a horizontal strut and a vertical strut.

\* \* \* \* \*